(12) United States Patent
Schep et al.

(10) Patent No.: US 7,046,596 B2
(45) Date of Patent: May 16, 2006

(54) RECORD CARRIER HAVING AN IMPROVED MODULATED SERVO TRACK FOR MORE RELIABLE SYNCHRONIZATION AND AN APPARATUS FOR SCANNING THE RECORD CARRIER

(75) Inventors: Cornelis Marinus Schep, Eindhoven (NL); Aalbert Stek, Eindhoven (NL); Hendrik Van Houten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 646 days.

(21) Appl. No.: 10/276,197

(22) PCT Filed: Mar. 14, 2002

(86) PCT No.: PCT/IB02/00743

§ 371 (c)(1),
(2), (4) Date: Nov. 12, 2002

(87) PCT Pub. No.: WO02/075736

PCT Pub. Date: Sep. 26, 2002

(65) Prior Publication Data

US 2003/0174603 A1    Sep. 18, 2003

(30) Foreign Application Priority Data

Mar. 16, 2001  (EP) .................................. 01201012
Oct. 15, 2001  (EP) .................................. 01203879

(51) Int. Cl.
*G11B 20/10*  (2006.01)
*G11B 7/24*  (2006.01)

(52) U.S. Cl. .................................. 369/47.19; 369/275.3
(58) Field of Classification Search .................... None
See application file for complete search history.

(56) References Cited

U.S. PATENT DOCUMENTS

| 6,538,982 B1 * | 3/2003 | Van Vlerken et al. ... 369/275.4 |
| 6,580,684 B1 * | 6/2003 | Miyake et al. ........... 369/275.3 |
| 6,765,861 B1 | 7/2004 | Van Vlerken et al. |
| 2003/0165095 A1 * | 9/2003 | Iimura et al. ............. 369/47.22 |

FOREIGN PATENT DOCUMENTS

WO  WO 00/43996  *  7/2000

* cited by examiner

*Primary Examiner*—Hoa T. Nguyen
*Assistant Examiner*—Christopher Lamb
(74) *Attorney, Agent, or Firm*—Edward W. Goodman

(57) ABSTRACT

A record carrier (1) has a servo track (4) indicating an information track (9) intended for recording information blocks represented by marks. The servo track (4) has a periodic variation of a physical parameter at a predetermined frequency and modulated parts for encoding position information at regular intervals. The modulated parts start with a bit sync element and are of a data type having a data bit element or of a word sync type having a word sync element. The bit sync element and the data bit element are modulated according to a same predetermined type of modulation of the periodic variation. The modulated parts further include modulated parts (40, 41) of an isolated bit sync type only having the bit sync element.

5 Claims, 5 Drawing Sheets

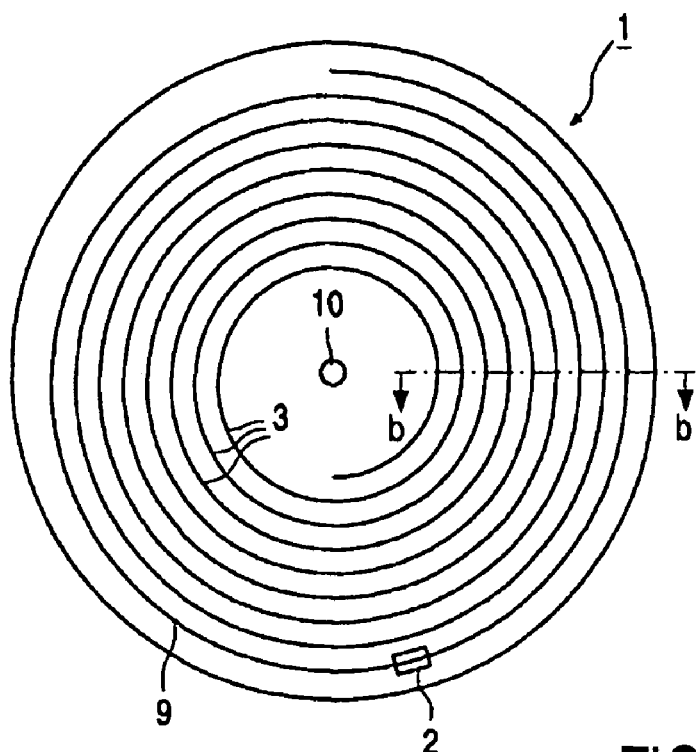
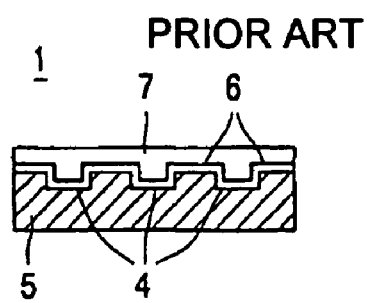
FIG. 1b
PRIOR ART
FIG. 1a
PRIOR ART
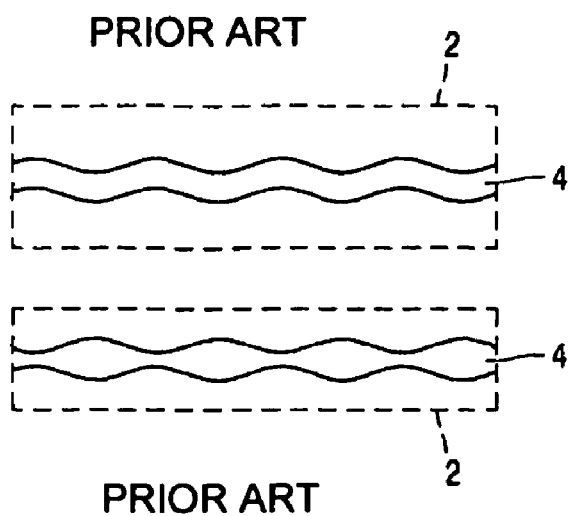
FIG. 1c
PRIOR ART
FIG. 1d
PRIOR ART

| BitSync number | Content |
|---|---|
| 0 | bitSync followed by wordSync 0 |
| 1 | bitSync followed by wordSync 1 |
| 2 | bitSync |
| 3 | bitSync |
| 4 | bitSync followed by nibble 1 |
| 5 | bitSync |
| 6 | bitSync |
| 7 | bitSync followed by nibble 2 |
| ... | ... |
| 46 | bitSync followed by nibble 15 |
| 47 | bitSync |
| 48 | bitSync |

FIG. 4

RECORD CARRIER HAVING AN IMPROVED MODULATED SERVO TRACK FOR MORE RELIABLE SYNCHRONIZATION AND AN APPARATUS FOR SCANNING THE RECORD CARRIER

BACKGROUND OF THE INVENTION

1. Field of the Invention

The invention relates to a record carrier comprising a servo track indicating an information track intended for recording information blocks represented by marks, the servo track having a periodic variation of a physical parameter at a predetermined frequency and modulated parts for encoding position information at regular intervals, the modulated parts starting with a bit sync element and being of a data type having a data bit element or of a word sync type having a word sync element, the bit sync element and the data bit element being modulated according to a same predetermined type of modulation of the periodic variation.

The invention further relates to recording and/or playback device comprising means for writing and/or reading information blocks in an information track on a record carrier that comprises a servo track indicating the information track, the recording and/or playback device comprising means for scanning the servo track, and demodulation means for retrieving position information from a signal generated by a variation of a physical parameter of the servo track at a predetermined frequency, the servo track having modulated parts for encoding position information at regular intervals, the modulated parts starting with a bit sync element and being of a data type having a data bit element or of a word sync type having a word sync element, the bit sync element and the data bit element being modulated according to a same predetermined type of modulation of the periodic variation.

The invention further relates to a method for manufacturing the record carrier.

2. Description of the Related Art

A record carrier and device for reading and/or writing information are known from International Patent Application No. WO 00/43996, corresponding to U.S. Pat. No. 6,765,861 (PHN 17,323). The information to be recorded is encoded into an information signal which includes address codes and is subdivided in accordance with the address codes into information blocks. The record carrier is of a recordable type and has a servo track, usually called a pre-groove, for causing servo signals to be generated when scanning the track. A physical parameter, e.g., the radial position, of the pre-groove, periodically varies at a predetermined frequency constituting a so-called wobble. During the scanning of the track, this wobble leads to a variation of the radial tracking servo signals and a wobble signal can be generated. The wobble is modulated according to a type of modulation using phase modulation for encoding position information. The phase modulation or frequency modulation used for encoding digital position information, is selected to minimally disturb the component of the predetermined frequency in the wobble signal, because that component is used to control the recording speed. Hence, a majority of the periodic variations need to be non-modulated, i.e., having the zero crossings not shifted from the nominal positions. During recording, the position information is retrieved from the wobble signal and is used for positioning the information blocks by keeping a predefined relation between the address codes in the information blocks and the position information. The addresses are encoded in modulated parts of the wobble starting with a bit sync element followed by either a word sync element or a data bit element.

A problem of the known system is that detection of the bit sync element is not reliable.

SUMMARY OF THE INVENTION

It is an object of the invention to provide a record carrier and device in which the synchronization is more reliable.

According to the invention, a record carrier as defined in the opening paragraph, is characterized in that the modulated parts further comprise modulated parts of an isolated bit sync type only having the bit sync element. Further, the recording and/or playback device as described in the opening paragraph, is characterized in that the demodulation means comprises means for detecting modulated parts of an isolated bit sync type only having the bit sync element.

The invention is based on the following recognition. The problem is due to the fact that in disc formats, such as DVD+RW and DVR, the same type of modulation is used for both bit syncs and data bits. In DVD+RW, the modulation is phase-shift keying, in the new proposed DVR system (Digital Video Recording), the modulation is minimum shift keying (MSK). When the detecting is not yet in lock, it can not distinguish between a bit sync element and a data bit element. It is to be noted that the data bit element may be followed by further data bit elements before a next sync element is included. The bit sync are located at a regular intervals, i.e., at constant distance to the previous and the next bit sync, e.g., 93 wobbles in case of DVD+RW, 56 wobbles in case of DVR. In one particular detection method to obtain bit sync, the detector searches for a number of modulated marks at the regular interval. However, if the data consist of a substantial number of consecutive ONE's or ZERO's, it is possible that the detector thinks it is detecting a bit sync whereas, in reality, it is detecting data bits. The data bits are thus misinterpreted as false bit syncs. The solution of this invention is to include bit syncs that are not followed by a data mark. It is then not possible for the detector to confuse data marks and bit sync, and detection of a false bit sync can be prevented. These specific bit syncs are referred to as "isolated bit syncs". Normally, one would not have isolated bit syncs. A bit sync usually is a sort of flag to indicate that a data bit will follow after the sync. In this case, the isolated bit sync has a different function. It does not indicate that a data bit will follow but it is used to improve the robustness of bit sync detection.

BRIEF DESCRIPTION OF THE DRAWINGS

These and other aspects of the invention will be apparent from and elucidated further with reference to the embodiments described, by way of example, in the following description and with reference to the accompanying drawings, in which:

FIG. 1a shows a record carrier with a servo track (top view);

FIG. 1b shows a servo track (cross section);

FIG. 1c shows a wobble of a servo track (detail);

FIG. 1d shows a further wobble of a servo track (detail);

FIG. 4 shows an isolated bit sync modulation scheme;

In the Figures, elements which correspond to elements already described have the same reference numerals.

DESCRIPTION OF THE PREFERRED EMBODIMENTS

Figure 2:
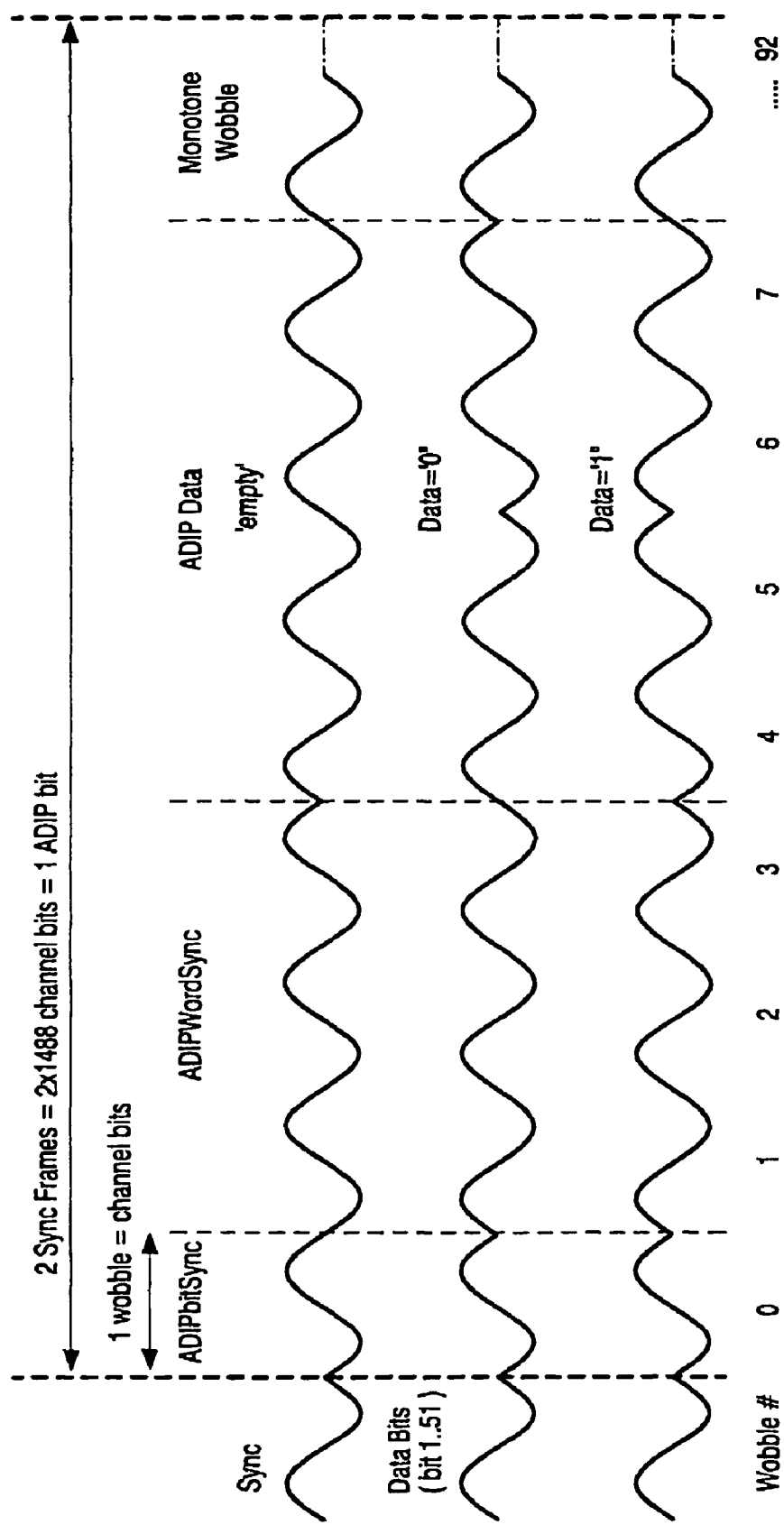
FIG. 2 shows bi-phase wobble modulation.

FIG. 1a shows a disc-shaped record carrier 1 provided with a track 9 intended for recording and a central hole 10. The track 9 is arranged in accordance with a spiral pattern of windings 3. FIG. 1b is a cross-section taken on the line b-b of the record carrier 1, in which a transparent substrate 5 is provided with a recording layer 6 and a protective layer 7. The recording layer 6 may be optically writable, for example, via phase change, or magneto-optically writable by a device for writing information, such as the known CD-Rewritable or CD-Recordable. The recording layer may also be provided with information via a production process, in which first a master disc is made which is subsequently multiplied through pressing. The information is organized in information blocks and is represented by optically readable marks in the form of a succession of areas reflecting much radiation and little radiation such as, for example, a succession of pits of different lengths in a CD. In one embodiment, the track 9 on the record carrier of a rewritable type is indicated by a servo-pattern which is provided during manufacture of the blank record carrier. The servo-pattern is formed, for example, by a pre-groove 4 which enables a write head to follow the track 9 during scanning. The pre-groove 4 may be implemented as a deeper or a raised part, or as a material property deviating from its ambience. Alternatively, the servo-pattern may consist of an alternation of elevated and deeper windings, referred to as land and groove patterns, with a transition from land to groove, or vice versa, taking place per winding. FIGS. 1c and 1d show two examples of a periodical variation of a physical parameter of the pre-groove, called wobble. FIG. 1c shows variation of the lateral position, and FIG. 1d shows variation of the width. This wobble produces a wobble signal in a tracking servo-sensor. The wobble is, for example, frequency-modulated, and position information, such as an address, a time code or winding information, is coded in the modulation. A description of a rewritable CD system which is provided with position information in such a way, can be found in U.S. Pat. No. 4,901,300 (PHN 12,398). A servo-pattern may also consist of, for example, regularly distributed sub-patterns which periodically cause tracking signals. Further, the servo-pattern may include modifications of the land area beside the pre-groove, e.g., an undulating pre-groove having land pre-pits in a specific pattern for encoding position information, like in DVD-RW.

The variation of the servo track includes relatively large parts of monotone wobble, so-called non-modulated parts. Further, the servo track has relatively short parts where the frequency and/or phase of the wobble deviates from the predetermined wobble frequency, called modulated parts. In this document, any servo-pattern of a periodic nature in combination with any additional elements encoding information is referred to as a servo track having a periodic variation of a physical parameter at a predetermined frequency, or wobble, that has modulated parts.

FIG. 2 shows a bi-phase wobble modulation. An upper trace shows the wobble modulation for a word sync pattern, a second and third trace show the wobble modulations for data bits of the address, the total modulation being called "Address In Pre-groove" (ADIP). Predetermined phase patterns are used for indicating a synchronizing symbol (ADIP bit sync) and a synchronization of the full address word (ADIP word sync), and for the respective data bits (ADIP Data='0', and ADIP data='1'). The ADIP bit sync is indicated by a single inverted wobble (wobble # 0). The ADIP word sync is indicated by three inverted wobbles directly following the ADIP bit sync, whereas data bits have non-inverted wobbles in this area (wobble # 1 to 3). An ADIP Data area comprises a number of wobble periods assigned to represent one data bit, in FIG. 2, the wobble periods numbered 4 up to 7 (=wobble # 4 to 7). The wobble phase in the first half of the ADIP Data area is inverse to the wobble phase in the second half of the area. As such, each bit is represented by two sub-areas having different phases of the wobble, i.e., called bi-phase. Data bits are modulated as follows: ADIP Data='0' is represented by 2 non-inverted wobbles followed by two inverted wobbles, and ADIP data='1', vice versa. In this embodiment, the modulation for data bits is fully symmetrical, giving equal error probability for both data bit values. However, other combinations of wobbles and inverted wobbles, or other phase values may be used. In an embodiment, a predetermined modulation is used after an ADIP Word Sync, indicating 'empty', instead of a data bit. Monotone wobbles may be used after the first data bit, or further data bits may be encoded thereafter. Preferably, a large majority of the wobbles is not modulated (i.e., has the nominal phase) for ensuring an easy lock and a stable output of a PLL in a detector; in this embodiment, the 8 possibly modulated wobbles are followed by 85 non-modulated (i.e., monotone) wobbles (wobble # 8 to 92). The output frequency of the PLL has to be as stable as possible, because during writing, the write clock is derived from the PLL output.

Figures 3, 7:
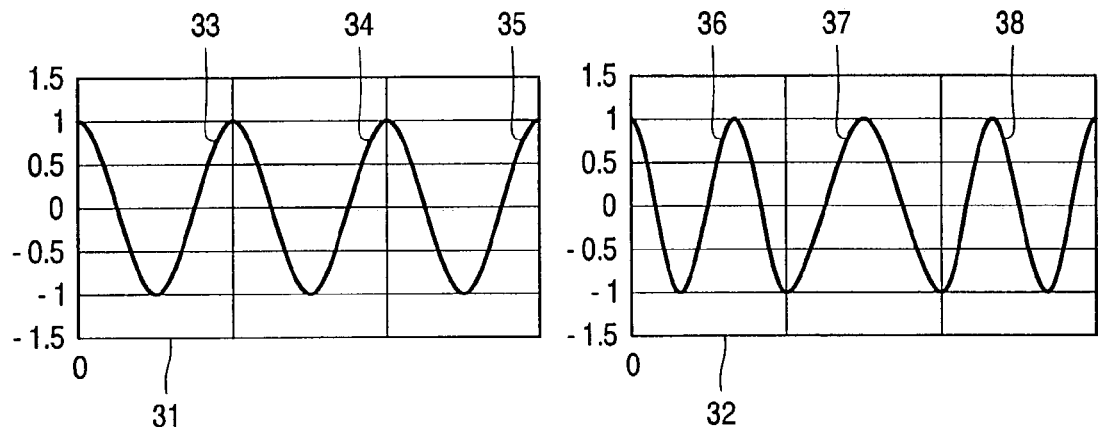
FIG. 3 shows MSK wobble modulation.
FIG. 7 shows a content of an address word including isolated bit syncs.

FIG. 3 shows MSK wobble modulation. The Minimum Shift Keying (MSK) modulation uses a first pattern 31 for transferring a first bit value and a second pattern 32 for transferring a second bit value. Further combinations of the patterns 31, 32 may be used to transfer synchronization information. Each MSK pattern has a central part of at least one full wobble period, in the first pattern, the central part 34 is non-inverted, while in the second pattern, the central part 37 is inverted. Each MSK pattern further has a starting part and an ending part. The left MSK pattern has a starting part 33 and an ending part 35 just being a single wobble period. The right MSK pattern has a starting part 36, which inverts the phase by having a frequency of 1.5 times the wobble frequency, i.e., by having 3 half sine periods within one wobble frequency period. The ending part is similar to re-invert the phase to the non-inverted state. Detection of MSK data bits is primarily based on the detection of the central part, because both central parts exhibit the maximum difference between the two patterns. In addition, the difference of the non-modulated starting part 33 and modulated starting part 36, and the non-modulated ending part 35 and modulated ending part 38 can be exploited for detection, the total length of these differences is estimated to have 50% of effective strength of detection when compared to the central part. The MSK encoding can be used to encode address bits in a pre-groove wobble, but the pre-groove wobble needs to be non-modulated for the majority of wobble periods. The large majority of non-modulated wobbles is needed for reliably controlling the rotation speed of the disc and/or the write clock of the recording process.

Figure 4:
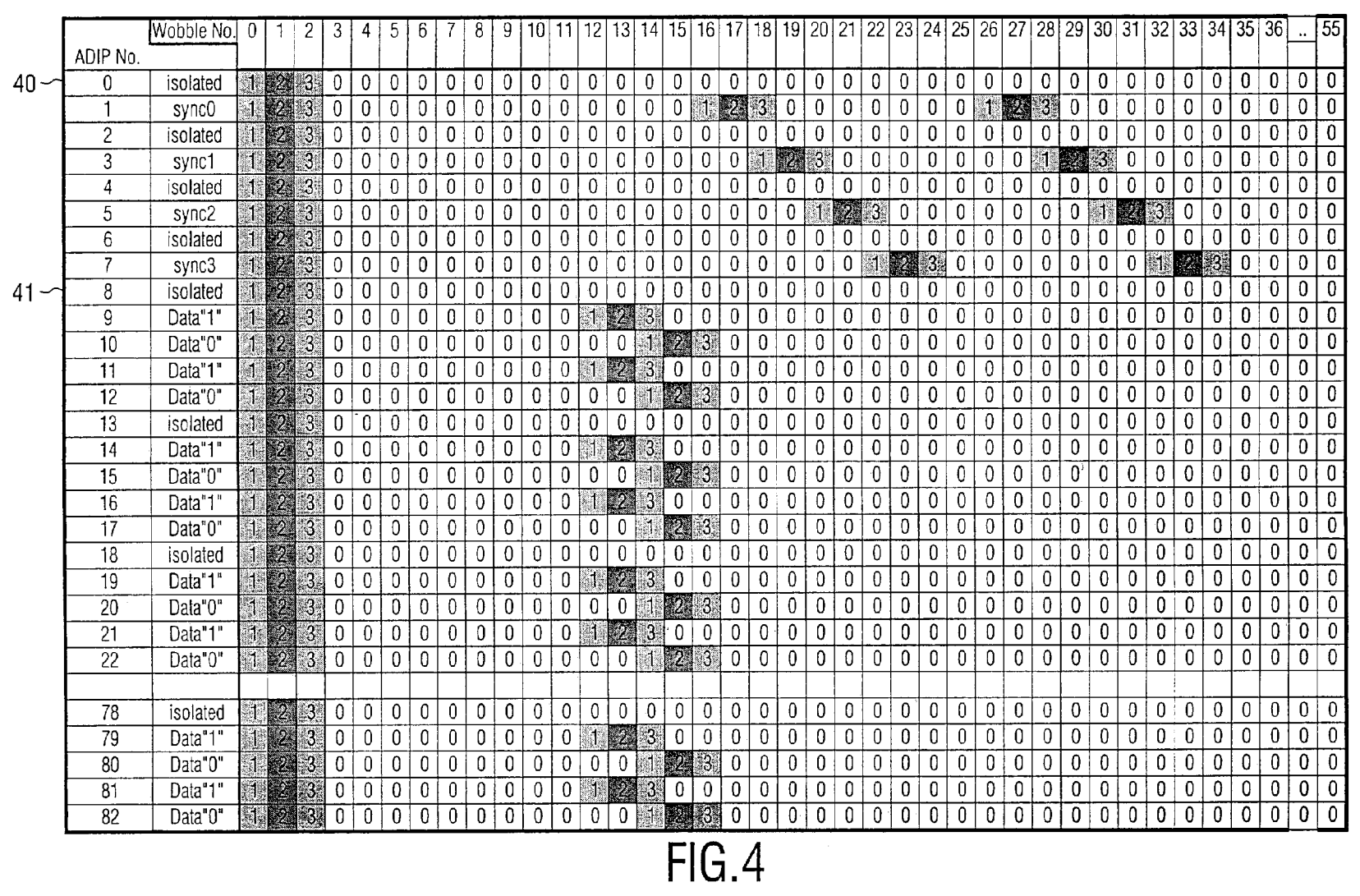

FIG. 4 shows an isolated bit sync modulation scheme based on the MSK wobble modulation. In each cell of the matrix shown, a zero indicates a non-modulated wobble, a one indicates a starting part of 1.5 wobble to invert the phase, a two indicates an inverted wobble, and a three indicates an ending part of 1.5 wobble to re-invert the phase to the normal state, as described above with reference to FIG. 3. In each row of the matrix, 56 consecutive wobbles are indicated (columns 37–54 all being zero), and each row starts with a bit sync element in columns 0, 1, 2. A total ADIP address word comprises 83 rows, and the rows are numbered according to their ADIP bit number. The ADIP bits numbered 0, 2, 4, 6 and 8, 13, 18, etc., are isolated bit syncs (40, 41). In ADIP bit 1, there is a first word sync element called sync0, and in ADIP bits 3, 5, 7, there are three further word sync elements sync1, sync2 and sync3. All word sync elements have a different configuration for maximum reliability of detection. Starting at ADIP bit 8, there is a repetitive pattern of 5 rows consisting of one isolated bit sync followed by 4 data bits; the values of the data bit elements in the Figure being arbitrary examples. Hence, in total, 13×4=52 data bits are available in the ADIP address word. It is to be noted that a same predetermined type of modulation is used for the isolated bit sync and the data bit elements. Hence, the danger of confusing bit sync elements with data bit elements is present. The same type of modulation includes minor differences in the specific modulation used for the bit sync and data bit elements, e.g., PSK (phase shift keying) for the bit sync and MSK (as described above with reference to FIG. 3) for data bit elements, because also, in such case, there is a risk of confusing.

Figure 5:
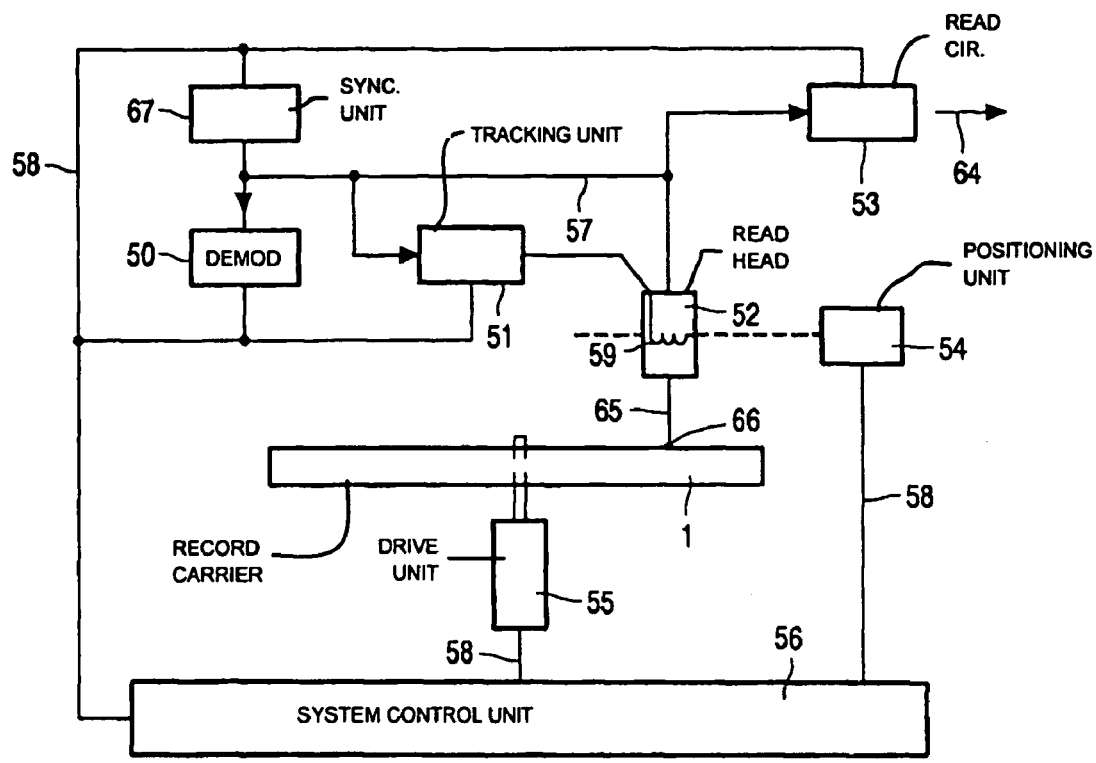
FIG. 5 shows a device for reading information blocks.

FIG. 5 shows a reading device for scanning a record carrier 1. Writing and reading of information on optical discs and formatting, error correcting and channel coding rules, are well-known in the art, e.g., from the CD system. The apparatus of FIG. 5 is arranged for reading the record carrier 1, this record carrier being identical to the record carriers shown in FIG. 1. The device is provided with a read head 52 for scanning the track on the record carrier 1 and read control means comprising a drive unit 55 for rotating the record carrier 1, a read circuit 53, for example, comprising a channel decoder and an error corrector, a tracking unit 51 and a system control unit 56. The read head 52 comprises optical elements of the usual type for generating a radiation spot 66 focused on a track of the recording layer of the record carrier 1 via a radiation beam 65 guided through optical elements. The radiation beam 65 is generated by a radiation source, e.g., a laser diode. The read head 52 further comprises a focusing actuator for focusing the radiation beam 65 on the recording layer, and a tracking actuator 59 for fine positioning of the spot 66 in radial direction on the center of the track. The apparatus has a positioning unit 54 for coarsely positioning the read head 52 in the radial direction on the track. The tracking actuator 59 may comprise coils for radially moving an optical element, or may be arranged for changing the angle of a reflecting element on a movable part of the read head or on a part on a fixed position in the case part of the optical system is mounted on a fixed position. The radiation reflected by the recording layer is detected by a detector of a usual type, e.g., a four-quadrant diode, for generating a detector signal 57 including a read signal, a tracking error and a focusing error signal. The tracking unit 51 is coupled to the read head 52 for receiving the tracking error signal from the read head and controlling the tracking actuator 59. During reading, the read signal is converted into output information, indicated by arrow 64, in the read circuit 53. The apparatus is provided with a demodulator 50 for detecting and retrieving the address information from the wobble signal included in the detector signals 57 when scanning the servo track of the record carrier 1. The device is further provided with a system control unit 56 for receiving commands from a controlling computer system or from a user, and for controlling the apparatus via control lines 58, e.g., a system bus connected to the drive unit 55, the positioning unit 54, the demodulator 50, the tracking unit 51 and the read circuit 53. To this end, the system control unit comprises control circuitry, for example, a microprocessor, a program memory and control gates, for performing the procedures described below. The system control unit 56 may also be implemented as a state machine in logic circuits. The read device is arranged for reading a disc having tracks having a periodic variation, e.g., a continuous wobble. The read control unit is arranged for detecting the periodic variations and for reading, in dependence thereon, a predetermined amount of data from the track. In particular, the demodulator 50 is arranged for reading position information from the modulated signal derived from the modulated wobble. The demodulator 50 has a detection unit for detecting modulated wobbles starting at the bit sync elements in the wobble signal which arrive after a long sequence of non-modulated wobbles. The demodulator further has a word detection unit for retrieving the words of address information based on the word sync elements. The beginning of such a word is detected from a word synchronization signal after the bit sync element. The value of a data bit is detected based on the data bit elements encoded by modulated wobbles. Further, the device has a synchronization unit 67 for detecting the isolated bit sync elements. In the modulation scheme described above with reference to FIG. 4, a number of isolated bit syncs are included, and the synchronization unit 67 detects the presence by detecting the absence of data bit elements following a bit sync element. By using the detected isolated bit syncs and under control of the system control unit 56, an erroneous state is detected in which the demodulator 50 is erroneously locked to data bits instead of bit syncs.

Figure 6:
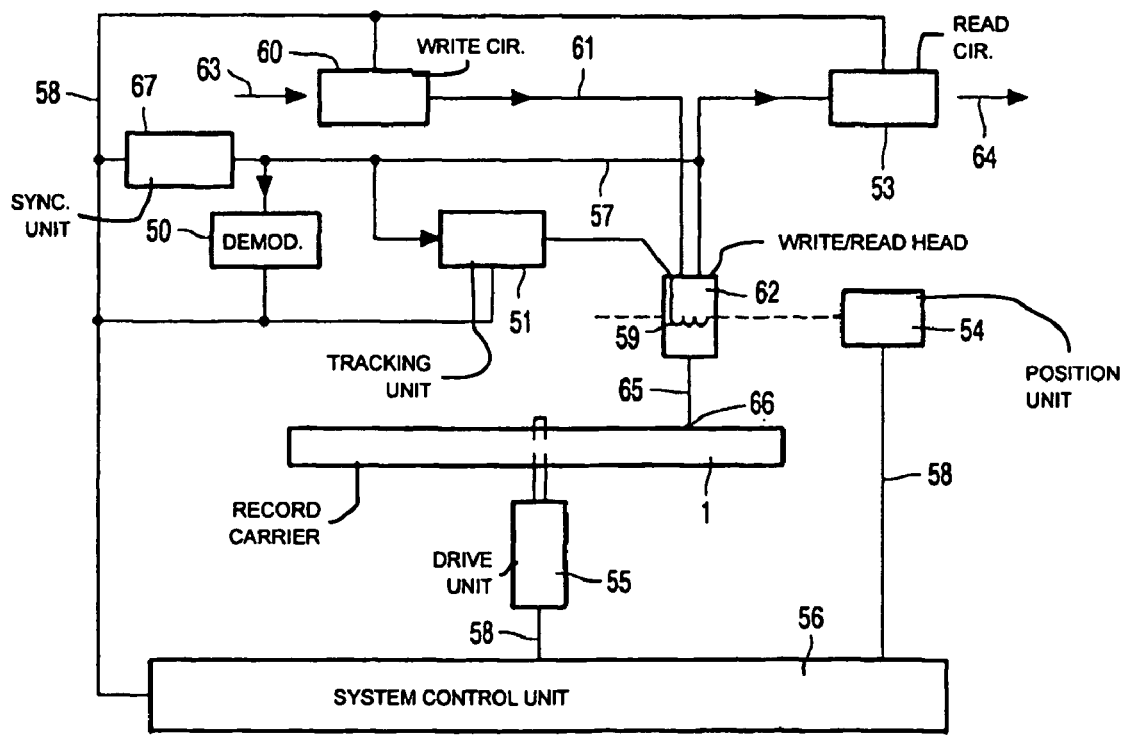
FIG. 6 shows a device for writing information blocks.

FIG. 6 shows a device for writing information on a record carrier, according to the invention, of a type which is (re)writable in, for example, a magneto-optical or optical manner (via phase change or dye) by means of a beam 65 of electromagnetic radiation. The device is also equipped for reading and comprises the same elements as the apparatus for reading described above with reference to FIG. 5, except that it has a write/read head 62 and recording control means which comprises the same elements as the read control means, except for a write circuit 60 that comprises, for example, a formatter, an error encoder and a channel encoder. The write/read head 62 has the same function as the read head 52 together with a write function and is coupled to the write circuit 60. The information presented to the input of the write circuit 60 (indicated by the arrow 63) is distributed over logical and physical sectors according to formatting and encoding rules, and converted into a write signal 61 for the write/read head 62. The system control unit 56 is arranged for controlling the write circuit 60 and for performing the position information recovery and positioning procedure as described above for the reading apparatus. During the writing operation, marks representing the information are formed on the record carrier. The recording control means is arranged for detecting the periodic variations, for example, by locking a phase-locked loop to the periodicity thereof. The demodulator 50 and the synchronization unit 67 are described above with reference to FIG. 5.

In an embodiment of position codes different from the scheme described with reference to FIG. 4, the addressing may comprise a suitable set of address symbols of at least 16 different symbols with Hamming distances equal to at least 4. Then, the address symbols need to have a length of 10 wobble periods. A Hamming distance 4 between address symbols allows good distinction between different words.

The number of address symbols is selected as follows: for sufficient addressing it is proposed to use 48 address bits, encoded in 12 address symbols, each containing 1 nibble of 4 bits. Preferably, isolated bit syncs that are not followed by an address symbol are included in the address word. The advantage is that locking to the bit sync is improved, because a lower number of false bit syncs will be detected. When detecting the bit sync next to the modulated address data bits, the detector might confuse an address bit with the bit sync. An isolated bit sync cannot be confused, because only non-modulated wobbles are surrounding the isolated bit sync.

A practical selection is to have 1 out of 4 bit syncs followed by an address symbol, and by having one bit sync followed by a word sync, in which the total length is 49 bit syncs (as described above).

FIG. 7 shows a content of an address word including isolated bit syncs according to the above embodiment. The address word is 60 address bits, i.e., 15 address symbols, each containing 1 nibble constituted by 4 data bit elements. Now, more bits are available for data and/or ECC (error correction code), and a maximum number of bits is available for nibble-based ECC. To keep the total address word length limited to the length of 49 bit syncs, now 1 of 3 bit syncs is followed by an address symbol, the remaining bit syncs are not followed by data values and, hence, are isolated bit syncs.

Although the invention has been explained by embodiments using a wobble modulation, any other suitable parameter of the track may be modulated, e.g., the track width. Also for the record carrier, an optical disc has been described, but other media, such as a magnetic disc or tape, may be used. It is noted, that in this document, the word 'comprising' does not exclude the presence of other elements or steps other than those listed, and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Record carrier comprising a servo track (4) indicating an information track (9) intended for recording information blocks represented by marks, which servo track (4) has a periodic variation of a physical parameter at a predetermined frequency and modulated parts for encoding position information at regular intervals, the modulated parts starting with a bit sync element and being of a data type having a data bit element or of a word sync type having a word sync element, the bit sync element and the data bit element being modulated according to a same predetermined type of modulation of the periodic variation, characterized in that the modulated parts further comprise modulated parts (40,41) of an isolated bit sync type only having the bit sync element.

2. Record carrier as claimed in claim 1, wherein the predetermined type of modulation is minimum shift keying modulation of the periodic variation.

3. Record carrier as claimed in claim 1, wherein the physical parameter is the position of the servo track and the variation is a displacement of the servo track in transverse direction.

4. Recording and/or playback device comprising means for writing and/or reading information blocks in an information track (9) on a record carrier that comprises a servo track (4) indicating the information track (9), which device comprises means for scanning the servo track (4) and demodulation means (50) for retrieving position information from a signal generated by a variation of a physical parameter of the servo track at a predetermined frequency, which servo track has modulated parts for encoding position information at regular intervals, the modulated parts starting with a bit sync element and being of a data type having a data bit element or of a word sync type having a word sync element, the bit sync element and the data bit element being modulated according to a same predetermined type of modulation of the periodic variation, characterized in that the demodulation means comprise means (67) for detecting modulated parts of an isolated bit sync type only having the bit sync element.

5. Device as claimed in claim 4, wherein the demodulation means (50) comprise means for detecting and correcting a synchronization state in which the demodulation means are erroneously locked on data bit elements instead of bit sync elements.

* * * * *